United States Patent

[11] 3,597,683

| [72] | Inventors | Shigebumi Saito<br>No. 30, 2-chome, Kamiuma-cho, Setagaya-ku, Tokyo;<br>Yoichi Fujii, No. 844, 3-chome, Mama-machi, Ichikawa-shi, Chiba-ken; Yutaka Ohno, No. 5-1, 4-chome, Saginomiya, Nakano-ku, Tokyo, all of, Japan |
|---|---|---|
| [21] | Appl. No. | 29,749 |
| [22] | Filed | Apr. 24, 1970 |
| [45] | Patented | Aug. 3, 1971 |
| [32] | Priority | Nov. 17, 1965 |
| [33] | | Japan |
| [31] | | 40/70470 |
| | | Continuation of application Ser. No. 595,170, Nov. 17, 1966, now abandoned. |

[54] CURRENT TRANSFORMER UTILIZING AN ELECTROMAGNETIC WAVE, A FARADAY ROTATOR, CIRCULAR WAVEGUIDES, HORN ANTENNAE, AND MODE CONVERTERS TO MEASURE CURRENT IN A HIGH VOLTAGE TRANSMISSION LINE
2 Claims, 6 Drawing Figs.

| [52] | U.S. Cl. | 324/96, 324/58 B |
|---|---|---|
| [51] | Int. Cl. | G01r 19/00, G01r 31/00 |
| [50] | Field of Search | 324/58, 58.5, 95, 96, 127, 117; 332/51 |

[56] References Cited
UNITED STATES PATENTS

| 3,212,031 | 10/1965 | Reggia et al. | 332/51 X |
|---|---|---|---|
| 3,274,516 | 9/1966 | Neckenburger | 332/51 |
| 3,324,393 | 6/1967 | Casey et al. | 324/96 |
| 3,413,055 | 11/1968 | De Sorbo | 324/96 X |
| 3,419,802 | 12/1968 | Pelenc et al. | 324/96 |
| 3,312,895 | 4/1967 | Garbuny | 324/96 |
| 3,324,393 | 6/1967 | Casey et al. | 324/96 |
| 3,363,174 | 1/1968 | Hudson et al. | 324/96 |

OTHER REFERENCES
Electrical World, Vol. 162; Nov. 16, 1964, p. 147; Copy in Scientific Library (TK 1 .E6) & Photocopy of page 147 in Group 258 (324-96).

*Primary Examiner*—Gerard R. Strecker
*Attorney*—Curt M. Avery

ABSTRACT: A laser beam is directed from a ground potential site to a Faraday rotation element provided in the magnetic field produced by the current in high voltage transmission line. The Faraday rotation element rotates a plane of polarization of the laser beam in accordance with the intensity of the magnetic field. The laser beam is transmitted through the Faraday rotation element to a polarization analyzer at the site. The analyzer produces an output proportional to the magnitude of the current in the line. In another embodiment, waveguide means are used to direct an electromagnetic wave from a ground potential site to a Faraday rotation element in the magnetic field produced by the current in the high voltage transmission line and back to the ground potential site. The wave is transmitted and received along the same path between a pair of horn antennae.

CURRENT OF TRANSMISSION WIRE IAC (R.M.S.) IN AMPERES

CURRENT TRANSFORMER UTILIZING AN ELECTROMAGNETIC WAVE, A FARADAY ROTATOR, CIRCULAR WAVEGUIDES, HORN ANTENNAE, AND MODE CONVERTERS TO MEASURE CURRENT IN A HIGH VOLTAGE TRANSMISSION LINE

This is a continuation of application Ser. No. 595,170, filed Nov. 17, 1966, and now abandoned.

DESCRIPTION OF THE INVENTION

This invention relates to a current transformer for a measuring device for measuring at a ground potential site the current of a high voltage power transmission line or bus by using electromagnetic wave such as microwaves or laser light as the medium. In principle, the current transformer of this invention is a current transformer for the measuring device utilizing the fact that what is called the Faraday rotation phenomenon in electromagnetic waves such as, for example, the effect of rotation of the plane of polarization shown by ferromagnetic material such as ferrites to the microwaves or the effect of rotation of the plane of polarization shown by flint glass, etc. to a laser beam, or such phenomenon as field displacement or resonance absorption is generated by the magnetic field associated in proportion to the intensity of the electric current flowing in the high voltage transmission line.

Since extra-high voltage power transmission lines are necessary for increasing electric power demands, protection against unexpected faults has been a problem of great importance. A necessary element of the protection system is a current transformer which samples current of a high voltage wire and supplies basic information on magnitude and direction of the current in order to determine time and location to operate one or more circuit breakers.

A conventional current transformer consists of iron cores and insulated wires immersed in insulating oil surrounded by a ceramic bushing. For an extremely high voltage line which exceeds 500 kilovolts, especially in an area having severe surface contamination, a conventional current transformer loses fidelity of wave form reproduction, but also needs a huge ceramic bushing which is very costly. In 1965, a current measuring device using light pulse trains frequency-modulated by a current of a high voltage wire was utilized. This device delivers precision data about the magnitude of the current, though it needs a package containing active electronic circuits in its energized part.

The main object of this invention is to measure an extra high voltage transmission line current above a voltage of 500 kilovolts, for example, at the ground potential site. Another object of this invention is to measure, without the large ceramic bushing capable of withstanding an extra high voltage, the iron cores and insulated wires immerse in insulating oil surrounded by a ceramic bushing required in a conventional current transformer.

A further object of this invention is, by the above method, to prevent troubles caused by the dielectric breakdown caused in the conventional current transformer by an abnormally high voltage, particularly the surge voltage wave caused by lightning, etc., and troubles caused by the dielectric breakdown caused by the contamination of the bushing by various chemicals. Another object of this invention is to eliminate the need for the transmitter comprising the active element and the power source required on the side of the high voltage transmission line in the conventional measuring instrument using radio telemetering instead of the conventional current transformer.

In order to realize these objects, the practical embodiment of this invention comprises a magnetic effect element provided in the magnetic field adjacent to the high voltage transmission line, for rotating the plane of polarization of or modulating the physical quantity, such as the phase or the amplitude of the electromagnetic wave sent from the ground potential site corresponding to the intensity of the magnetic field adjacent to the high voltage transmission line. An electromagnetic wave radiator radiates an electromagnetic wave, such as microwaves or laser light, from the ground potential site to the magnetic effect element. A device sets the electromagnetic wave passage so that the electromagnetic wave passes the said magnetic effect element and is supplied to the measuring instrument at the ground potential site. A demodulator receives the electromagnetic wave fed back to the ground potential site and converts it into a physical quantity proportionate to the line current.

Since the current transformer for an electromagnetic wave measuring instrument in accordance with this invention can measure the magnitude of the electric current without any insulated conductor even when the electric current to be measured is in a high voltage region, it is possible to eliminate the problem of insulation. Furthermore, since iron cores or the like are not used, it is also possible to measure the direct current. The present invention thus provides an extremely excellent measuring means for the transformation of a extra high voltage and a large current and its effect becomes great in a measuring system for use in an extra high voltage, etc., where there is a problem of insulation.

Those and further objects, advantages nd special features of the invention will become more clear as the description proceeds with reference to the accompanying drawings, in which.

In the FIGS., the same components are identified by the same reference numerals.

Figure 1:
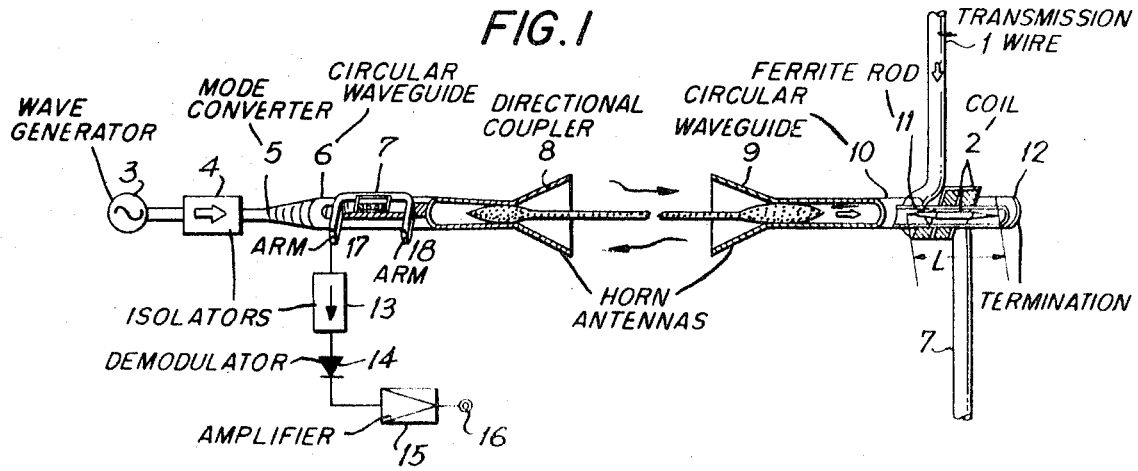
FIG. 1 is a perspective view of an embodiment of the current transformer of the present invention using the Faraday rotation of the plane of polarization of microwaves.

The current transformer of the present invention is included in measuring apparatus which utilizes an electromagnetic wave for measuring the current in a high voltage transmission line. In the embodiment of FIG. 1, the current transformer comprises a ground potential site which includes a wave generator for transmitting to the high voltage transmission line an electromagnetic wave. A magnetic effect element is provided in the magnetic field produced by the current in the high voltage transmission line for modulating the electromagnetic wave transmitted from the site in accordance with the intensity of the magnetic field. Horn antennae direct the electromagnetic wave from the site to the magnetic effect element. The electromagnetic wave is transmitted through the magnetic effect element and the modulated electromagnetic wave is directed back to the site via the Horn antenna. A demodulator converts the returned modulated electromagnetic wave to an output proportional to the magnitude of the current in the high voltage transmission line.

In FIG. 1, a coil 2 to increase the intensity of the magnetic field is connected in series with a high voltage transmission wire 1. The coil 2 is wound around an end part of the circular wave guide 10. The magnetic field is therefore in the direction of the axis of the circular wave guide associated with the current flowing in the coil 2. A ferrite rod 11 is provided along the magnetic field. The other end of the circular wave guide 10 is connected to a horn antenna 9 for receiving the electromagnetic wave transmitted from the ground potential site.

The termination of the circular wave guide 10 is so shorted that the electromagnetic wave passed through the ferrite rod 11 is able to reflect and pass again through said ferrite rod 11. On the other hand, at the ground potential site the electromagnetic wave from a wave generator 3 is transmitted through an isolator 4, a mode converter 5, a circular wave guide 6 and a horn antenna 8 and is transmitted to a horn antenna 9.

The electromagnetic wave sent back from the horn antenna 9 is received by said horn antenna 8. Part of the energy transmitted from the antenna 9 is obtained by means of a directional coupler 7 connected to the circular wave guide 6 and transmitted to a demodulator 14 through a isolator 13. The output energy of said demodulator 14 is amplified by a amplifier 15 and led to a output terminal 16. Therefore, by means of a measuring device connected to the output terminal 16, the magnitude of the current in the high voltage transmission wire can be observed.

As evident from the foregoing, the output of electromagnetic wave generator 3 generates a linearly polarized wave in the circular waveguide 6 when it enters said circular waveguide through isolator 4.

By the way, the circular waveguide can transmit an electromagnetic wave in any direction parallel to the section. (This will be hereafter referred to as the $TE_{11}$ mode.)

Therefore, if the electromagnetic wave is transmitted from the electromagnetic wave generator 3 described above into circular waveguide 6 through mode converter 5, it is possible to provide a linearly polarized wave which is polarized in a certain direction determined by the geometric arrangement of said mode converter.

The linearly polarized wave in this direction passes through circular waveguide 6 without disturbance of the mode. The horn antenna 8 transmits the electromagnetic wave to the high voltage site.

At the high voltage site, the electromagnetic wave is again converted into the mode of circular waveguide 10 by horn antenna 9 and is linearly polarized and is led to the cylindrical ferrite rod 11.

The of 2 is wound around the ferrite rod 11 and therefore the line current generates a magnetic field parallel to the axis of the ferrite rod. The intensity H of this magnetic field is precisely proportional to the electric current of the high voltage transmission line. At this time, the plane of polarization of the linearly polarized wave passing through the ferrite rod 11 rotates by the Faraday effect as far as said ferrite rod is magnetized in the saturated region.

Figure 2:
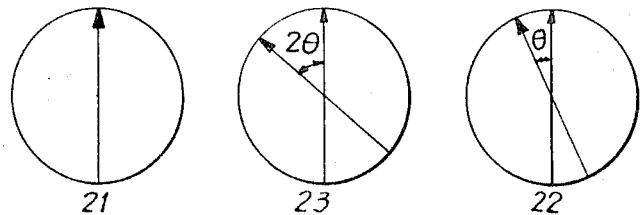
FIG. 2 is a comparative diagram showing angles of Faraday rotation in each part of the embodiment shown in FIG. 1.

Namely, if the linear polarization in electromagnetic wave generator 3 is directed as shown in the circle diagram 21 shown in FIG. 2, the polarization in the circular waveguide 10 in the high voltage site is also directed in the same direction. If this passes through the ferrite rod 11, it rotates by a certain angle $\theta$ as shown by the direction of circle diagram 22 shown in FIG. 2.

This angle of rotation $\theta$ can be expressed as $$\theta = VHL$$

when the length of ferrite rod 11 is L and the magnetic field intensity in the axial direction is H. Here, V is Verdet's constant, which is a constant determined corresponding to the Faraday rotation material such as the ferrite.

Then, said electromagnetic wave further proceeds and comes to the termination 12, where it is reflected and passes through the ferrite rod 11 again as it returns. Therefore, the plane of polarization is rotated again by $\theta$ in the same direction according to the principle of Faraday rotation, with the result that the plane of polarization has rotated by $2\theta$ altogether, as shown by circle diagram 23 in FIG. 2. Then, the electromagnetic wave returns by the same route as it passed when it went to the high voltage site and is supplied to circular waveguide 6 at the ground potential site, which is the transmitting side. Since the circular waveguide 6 includes a directional coupler 7 provided in a direction shifted by 45° from polarization of the linearly polarized wave, the reflected wave which has been fed back passes through the arm 17 of said directional coupler at its amplitude $\cos(45°-\theta)$ and enters the demodulator 14 through the isolator 13. This output I is $$I \alpha \cos[(45° - 2\theta)]^2 \quad (1)$$

and when $2\theta$ is smaller than 45°, I is $$I \doteq I_0 + (I_1)2\theta \quad (2)$$

Here, $I_0$ and $I_1$ are constants, so that if only the variable value (the second term of the right-hand side) is noticed, it is proportional to $\theta$, i.e., the magnetic field intensity and accordingly to the transmission current. Therefore, needless to say, it is possible to reproduce at the output terminal 16 an electric current having a waveform similar to the waveform of the electric current of the transmission line and having a value of the ratio of transformation of the absolute value of the line current after amplifying the output in the amplifier 15 by a suitable factor. The output at the output terminal 16 can be read by an indicating instrument and the indicated value available at this time is proportional to the line current.

By the way, it is possible to give the property of redundancy to the system by providing other demodulator means and other amplifier means as the auxiliary devices through other 45° directional coupler means provided at positions symmetrical to the circular waveguide 6. Furthermore, when trouble in the electromagnetic wave generator 3, the automatic switching can be readily performed by using the demodulator output as a pilot for switching.

Also, the compensation of the loss of the transmission line system or the self scaling thereof and the zero point scaling of the indicated value can be readily performed by modulating the electromagnetic wave generator 3 by a low frequency square wave signal and controlling the detection and amplification by this signal or performing the local feedback.

Faraday effect in the magnetic effect provided in the high voltage site has been explained above. It has been proved by experiment, however, that it is possible to reproduce the current signal by means of what is called the amplitude detection and phase detection. This makes the transmission line current the amount of attenuation or the amount of phase displacement of the electromagnetic wave which passes as the variation of the magnetic permeability of the element by adopting the field displacement type, i.e., by providing and affixing the ferrite and the bias magnet in the waveguide in parallel with the transmission line, thus constituting the system as the isolator type or the phase shifter type.

Also, it is possible to improve the linearity by adopting the element constitution of the magnetic resonance absorption type, i.e., by facing absorbing cells to the transmission line by the bias magnets and varying the amount of absorption of the electromagnetic wave corresponding to the variation of the line current or detecting it as the differential type of a phase $OI\pi$.

As described above in detail, in this invention, the electromagnetic wave is sent out from the ground potential site and is passed through the magnetic effect element in the high voltage site and is modulated by the line current and the fed back wave is detected at the ground potential site, whereby it is possible to measure the line current in the high voltage site, without any contact or conductor. It is thus possible to completely overcome the problems of the insulation of the device and its structure, which it has hitherto been difficult to solve, and perform an extremely accurate and reliable measurement with inexpensive equipment.

Figure 3:
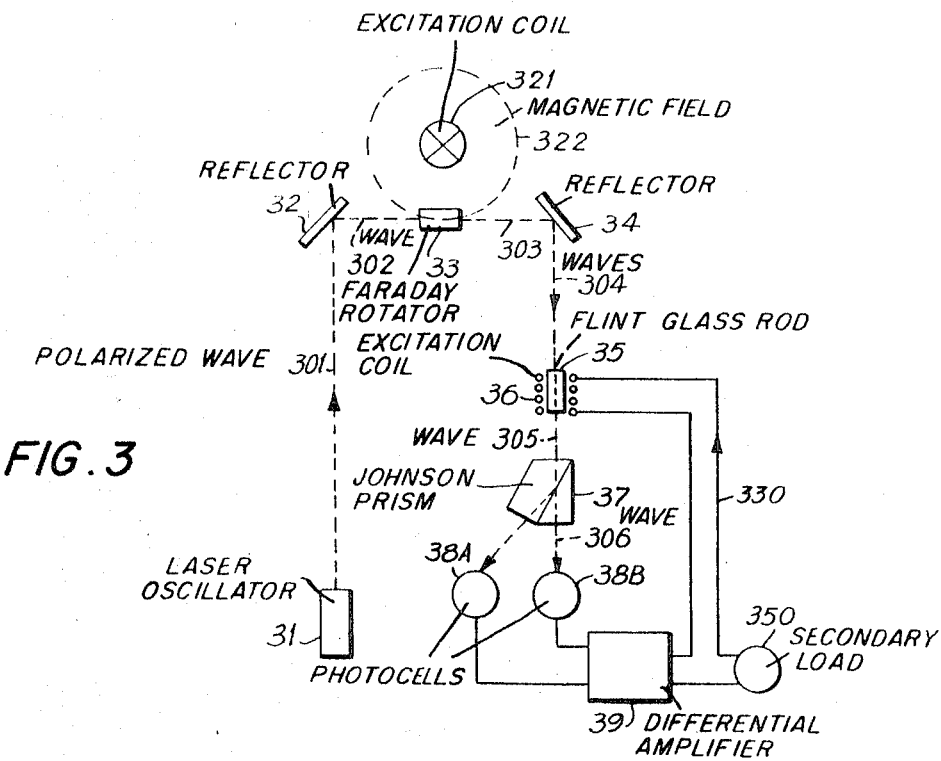
FIG. 3 is a block diagram which shows the principle of another embodiment of the current transformer of the present invention using the Faraday rotation of the plane of polarization of laser light.

FIG. 3 shows a current transformer using laser and is particularly a device in which two Faraday rotators are used and the ratio of transformation of the electric current is determined by only the turn ratio of the windings which provides a magnetic field for said rotors.

As is well known, a Faraday rotor located in the magnetic field rotates the linear angle of polarization which passes through the rotor. It is possible to know the value of the magnetic field by measuring this angle of rotation. In a measuring instrument for measuring the magnetic field as described above and the value of the electric current which is generating the magnetic field, the measured value of the electric current is varied by the drift by the gain of the detector and the amplifier or the strength of light and therefore it cannot be used for a precise measurement. It is possible to automatically control the gain of the amplifier, etc. with the purpose to supplement the above defect, but ordinarily this is not yet enough to insure a sufficiently precise measurement.

In order to overcome the above defect, the embodiment of FIG. 3 is provided with a Faraday rotator for compensation purposes in addition to the Faraday rotator for measuring purposes and is so constituted that the current transformation ratio may be determined by only the turn ratio of the excitation coils providing the magnetic field for the two Faraday rotators.

Figure 5:
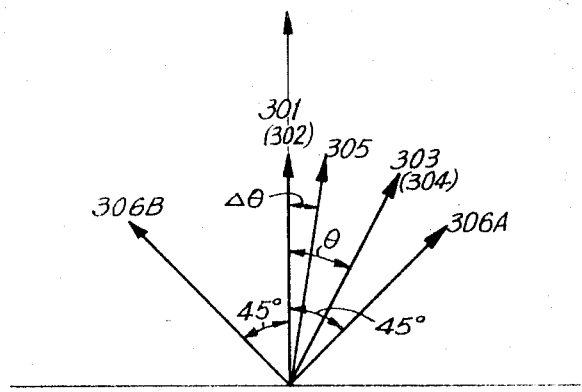
FIG. 5 is a comparative diagram which shows the angle of rotation of the plane of polarization of laser light in each part of the current transformer of FIG. 3.

FIG. 3 shows an embodiment of this invention in which a laser light polarized linearly in a direction as shown by 301 in FIG. 5 appears from laser oscillator 31 and goes to Faraday rotator 33 through a suitable reflector 32 and an optical system. This Faraday rotator 33 is made of a material of a large Faraday rotation effect such as flint glass and transmits the laser light well. An excitation coil 321 for providing the magnetic field is provided adjacent to the Faraday rotor, whereby a magnetic field 322 is generated. The number of turns of the excitation coil 321 in the device of FIG. 3 is made ½ turn so that it may be used for measuring a large current. The angle of polarization of the linearly polarized wave 301 and 302 shown in FIG. 5 is rotated by said magnetic field 322 by angle of $\theta$ as shown by linearly polarized wave 303 when the linearly polarized wave 301 and 302 passes through the Faraday rotor 33.

The linearly polarized wave is then led to the flint glass rod 35 for compensation through a suitable reflector 34 and an optical system. Here, the plane of polarization is rotated by $\theta'$ in the reverse direction as shown by 305 in FIG. 5 by the magnetic field by the excitation coil 36 wound around the flint glass rod 35.

Thus, the angle of polarization has rotated by $\Delta\theta = \theta - \theta'$ from the position of the initial angle of polarization 301 and 302. This $\Delta\theta$ becomes the error signal and is divided by polarization resolver 37 into two directions of polarization 306A and 306B both shifted from the original angle of polarization 301 and 302 in FIG. 5 by 45° and meeting at right angles with each other. The polarization resolver 37 consists of three prisms which are made of calcite crystal ($CaCo_3$) and is called "a modified Glan-Thompson prism" or "Johnson's Prism."

The directions of polarization 306A and 306B are converted into electric signals by two photocells, 38A nd 38B respectively and these electric signals are amplified by a differential amplifier 39. If $\Delta\theta$ is 0, the signals sent out of the two photocells, 38A and 38B are equal in value so that the output of the differential amplifier 39 becomes 0. If $\Delta\theta$ is not 0, the outputs of the two photocells 38A and 38B become different from each other so that the amplified difference signal appears at the differential amplifier. If this is fed back to the excitation coil 36 of the flint glass 35 for compensation purposes as described above with such a polarity that $\Delta\theta$ may become small, it becomes possible to make $\Delta\theta$ extremely small, substantially 0. Then, since the Faraday rotation angles $\theta$ and $\theta'$ are proportional to intensity of the magnetic field, the Faraday rotation angle by the magnetic field due to the electric current flowing through the excitation coil 36 for compensation purposes becomes equal to the Faraday rotation angle by the magnetic field 322 for measuring purposes. The and therefore the electric current 330 of the excitation coil 36 for compensation purposes is determined only by the electric current to be measured of the high voltage transmission line and correctly the turn ratio of the two coils. Therefore, if this electric current 330 of the excitation coil for compensation is supplied to a determined secondary load 350, a current transformer for a measuring device can be obtained.

In this system, if the gain G of the differential amplifier 39 is made large, the error $\Delta\theta$ can be made small and if the loop gain including, for example, the passing loss of the laser output and light, the coefficient of conversion from the angle of polarization to the voltage of polarization resolver 37 and photocells 38A and 38B and the gain of differential amplifier 39, is made 1000, the error $\Delta\theta$ can be made 1/1000. The system can therefore reproduce the current amplitude with a sufficiently high precision as a current transformer for a measuring device and is not affected by the variation which occurs in the middle of the system.

Also, according to the theory of automatic control, the precision of reproduction of the phase can be made high by making the frequency band of the feedback loop sufficiently wide.

Again, in this system, the angle of polarization $\theta$ becomes nearer to 45° than in the other systems and this system can also be used in a region in which the characteristic between the angle of polarization $\theta$ and the output voltages of photocells 38A and 38B, becomes nonlinear and the maximum angle of polarization that can be used is 45°.

However, in the system described above, although the error $\Delta\theta$ is small, it still has a finite value and also the maximum angle of polarization that can be used is limited to 45°. In order to obviate these defects, in the embodiment of FIG. 4, first of all, the passage of the laser is mounted in the interior of the supporting insulator 411 of the electric wire through which the electric current to be measured flows and this embodiment is different from the embodiment of FIG. 3 only in the point that an integration circuit 410 is provided before or after the differential amplifier 39. The error voltages provided by the photocells 38A and 38B are integrated by the integration circuit 410 and this is amplified and the electric current is supplied to the excitation coil 36 for compensation purposes, so that $\Delta\theta$ can be made 0. Also, the limitation of 45° is eliminated from the value of the angle of polarization $\theta$ to be measured and $\theta$ can be made any desirable value.

Figure 4:
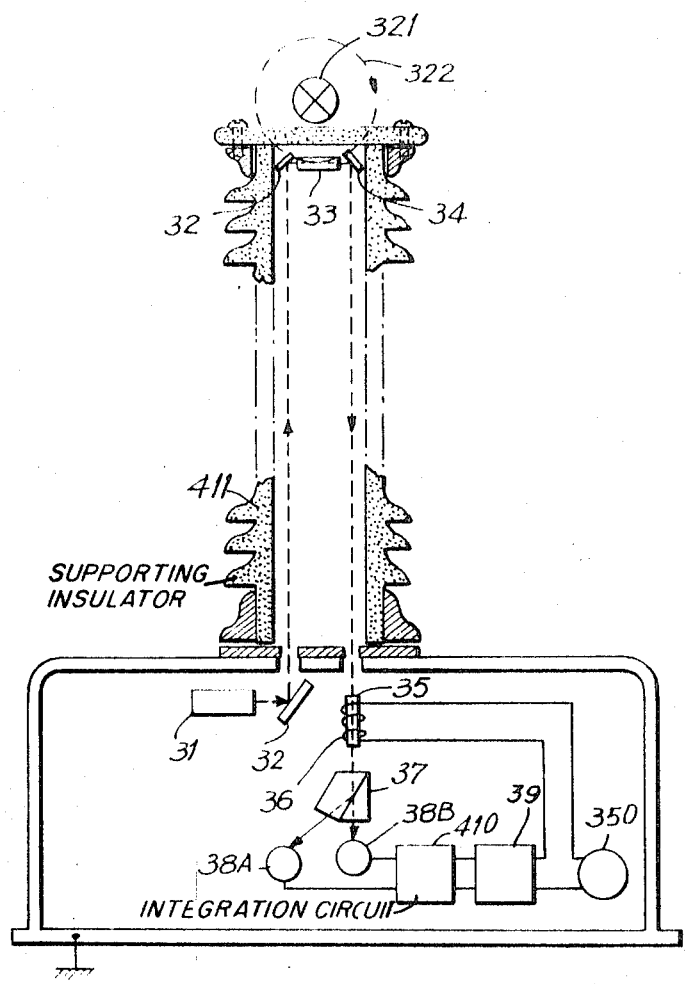
FIG. 4 is a perspective view of the actual constitution of another embodiment of the current transformer of the present invention.

In the present embodiment shown in FIG. 4, a helium-neon gas laser is utilized as a light source which has 6,328 angstrom wavelength.

Its output beam is arranged to travel through a 5 centimeter long heavy flint glass rod supported by a piece of dielectric perpendicularly to a power transmission wire. The distance between the centers of the wire and the rod was 2 centimeters. A transmitted beam from the rod was incident to a modified Glan-Thompson prism made of calcite crystals, and the two output beams were detected by two photocells having diameters of 0.8 centimeters. The output voltages of the cells were fed into a 40 decibel gain differential amplifier, of which output was displayed on an oscilloscope.

Sensitivity of he experimental laser current transformer was estimated. Assuming that Verdet's constant of the heavy flint glass is $3.2 \times 10^{15}$ radians per ampere-turn, the intensity of the incident beam to the analyzer, was 0.9 milliwatts. A quantum efficiency and a load resistance of the solar cells were 60 percent and 600 ohms respectively, and the total loss of the modified Glan-Thompson prism was one decibel.

A gain of 100 (40 db.) was assumed for the differential amplifier. A peak-to-peak voltage of 
$V_{OUT} \cong \times I_{AC}$ (amperes) millivolts therefore appeared at its output terminals.

Figure 6:
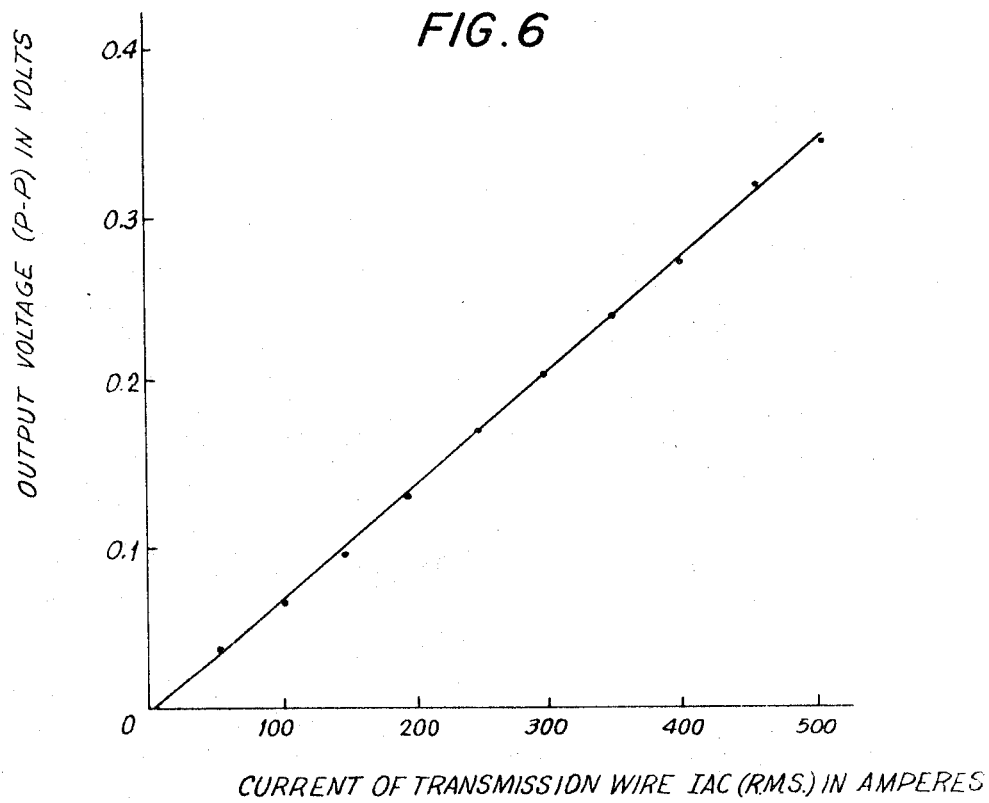
FIG. 6 is a comparative diagram showing a measured relation between an output voltage of he differential amplifier and a current of the high voltage transmission line.

FIG. 6 shows a measured relationship between an output voltage of the differential amplifier and a root-mean-square current amplitude measured by a conventional current transformer and ammeter. Good linearity and agreement with the estimate are seen in FIG. 6. A transient current waveform has been also observed with little effect of distortion on the oscilloscope.

Noise level is currently limited by intensity fluctuations of the laser beam, and is about 15 millivolts peak-to-peak at the output of the amplifier. This value can be reduced by an order of magnitude by stabilizing the laser output power.

We claim:
1. A current transformer for measuring apparatus utilizing an electromagnetic wave for measuring the current in a high voltage transmission line, said current transformer comprising:

a ground potential site for transmitting to said high voltage transmission line an electromagnetic wave;

a Faraday rotation element provided in the magnetic field produced by the current in said high voltage transmission line for modulating an electromagnetic wave transmitted from said site in accordance with the intensity of said magnetic field;

electromagnetic wave generating means at said ground potential site for directing the electromagnetic wave from said site to said magnetic effect element;

guide means for transmitting the electromagnetic wave, said guide means including a mode converter, a first circular waveguide at said ground potential site, a first horn antenna at said ground potential site, a second horn antenna at said high voltage transmission line, a second circular waveguide at said high voltage transmission line, said mode converter being coupled to said first circular waveguide for converting the mode of the electromagnetic wave transmitted from said ground potential site to the $TE_{11}$ mode, each of said first and second horn antennae being mounted at an end of a corresponding one of said circular waveguides facing the other; and receiving means at said ground potential site for receiving the modulated electromagnetic wave, said receiving means including a directional coupler coupled to said first circular waveguide and demodulating means connected to said receiving means for converting the received modulated electromagnetic wave to an output proportional to the magnitude of the current in said high voltage transmission line.

2. A current transformer as claimed in claim 1, wherein said directional coupler is so coupled to said first circular waveguide that the plane of polarization of the electromagnetic wave radiated to said circular waveguide from said mode converter forms an angle of 45° with the plane of polarization of said directional coupler.